Aug. 25, 1970 R. W. FLETCHER 3,525,983
COMPRESSED SELECTION MATRIX
Filed Aug. 24, 1967
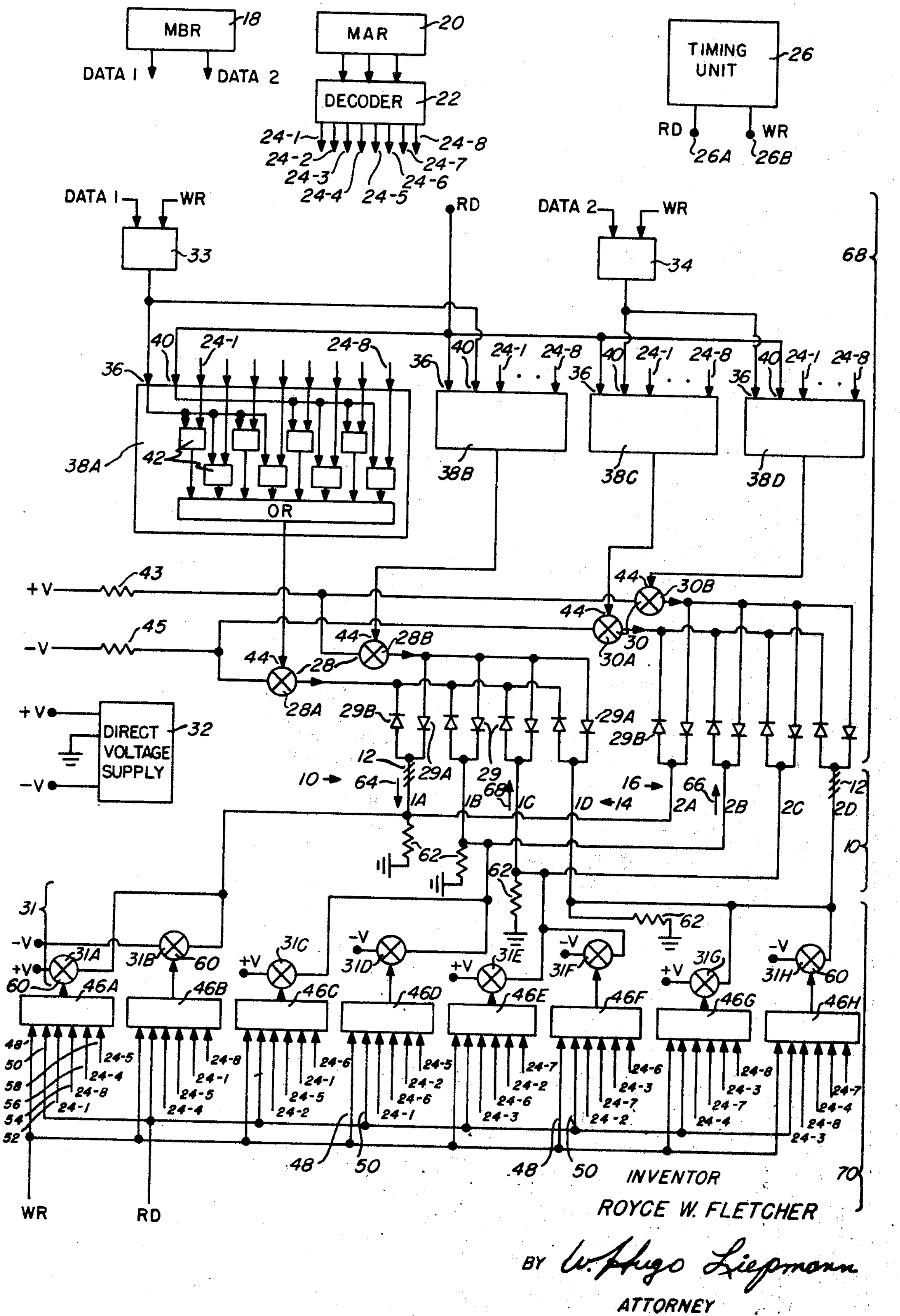
INVENTOR
ROYCE W. FLETCHER
BY W. Hugo Liepmann
ATTORNEY United States Patent Office
3,525,983
Patented Aug. 25, 1970

3,525,983
COMPRESSED SELECTION MATRIX

Royce W. Fletcher, South Natick, Mass., assignor to Honeywell Inc., Minneapolis, Minn., a corporation of Delaware Filed Aug. 24, 1967, Ser. No. 663,114
Int. Cl. H04q *9/00*
U.S. Cl. 340—166 11 Claims

ABSTRACT OF THE DISCLOSURE

Electronic selection apparatus of the type used to operate selected magentic cores in ferrite core coincident current memories is arranged to actuate pairs of core-threading conductors, or other circuit elements, simultaneously with oppositely-directed currents. The result is a substantial saving in circuit components and equipment size compared to prior apparatus.

The selection apparatus includes a first bank of switches connected with a first group of conductors, a second bank of switches connected with a second group of conductors, and a third switch bank connected with the other ends of both conductor groups. Logic circuits operate the three switch banks to activate a single conductor in each group.

BACKGROUND

This invention relates to a matrix-type selection circuit for simultaneously activating pairs of selected conductors or other bidirectional circuit elements. The selection circuit is particularly useful for operating random access magnetic memories, and more specifically, for energizing selected core-threading conductors in coincident current core memories of this type. The invention is equally useful for operating the selection or drive conductors of newer magnetic memories such as plated-wire thin-film memories. Although not necessarily limited to this use, the invention will, for clarity, be described with reference to a memory selection circuit.

Magnetic core memories are constructed with ferrite cores arranged in rectangular arrays. At least two conductors, one termed a Y-selection line and the other termed an X-selection line, thread each core. A selected core is operated to store a binary digit in it, i.e. to write a bit, or to read a bit from it, by applying current pulses to the X and Y lines threading that core. The resultant magnetic flux which the two coinciding signals produce in the selected core switches that core in the desired manner. However, the current pulse on each line is by itself insufficient to switch other cores that the line threads.

It is known to select one line of a group of lines threading an array of cores by the use of two banks of switches connected to the lines through isolating diodes. See for example the article entitled "Design of an Integrated Submicrosecond Core Memory" by Jamieson, Booth and Riechard appearing in the April 1966 issue of "Electromechanical Design" (vol. 10, No. 4, pp. 28–37). With this and other similar prior art techniques, an additional pair of switch banks and associated logic circuitry is required for each group of lines from which one line is to be selected. A large memory, accordingly, requires a great many selection switches and much associated logic circuitry.

It is an object of this invention to provide an improved selection circuit for a magnetic memory. A further object is to provide a selection circuit for performing the foregoing memory line selection operation and which has fewer components, and hence is more compact, than prior selection circuits of the same capacity.

Another object of this invention is to provide a selection circuit for simultaneously energizing a single bidirectional circuit element in each of two groups thereof.

It is also an object of the invention to provide a selection circuit for simultaneously operating selected pairs of bidirectional circuit elements.

Other objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY OF THE INVENTION

The present selection circuit employs two banks of switches connected to a group of selection lines through a network of isolating diodes as in the prior art. However, contrary to the prior art, one bank of switches is arranged to operate also with another group of selection lines.

With this arrangement, two groups of selection lines, e.g. the groups of Y-selecting lines for operating two magnetic cores to store two bits of a binary word, are operated with roughly one and one-half times the number of switches required to operate a single group of lines. By contrast, the prior are selection circuit for operating the same two groups of lines requires two times the number of switches as for one group of lines. Thus the present invention provides a considerable saving of circuit components, and a comparable saving in cost and space, as well as increased reliability.

BRIEF DESCRIPTION OF DRAWINGS

For a fuller understanding of the nature and objects of the invention, reference should be had to the following detailed description taken in connection with the accompanying drawing, which is a schematic representation of apparatus for operating Y-selection lines in a coincident-current ferrite core memory in accordance with the invention.

DESCRIPTION OF PREFERRED EMBODIMENT

The drawing shows part of a memory 10 for storing two binary digits, referred to as the Data 1 and Data 2 bits. The Data 1 bit can be stored on a magnetic core 12 threaded by one Y-selection line 1A, 1B, 1C and 1D in a group 14 of four such lines. Data 2 bit can be stored on cores 12 threaded by one Y-selection line 2A, 2B, 2C and 2D in a second group 16 of four lines. X-selection lines, not shown, threading the cores in a conventional manner are operated to select one core on the selected Y-line in each group 14 and 16.

As is conventional, a memory buffer register (MBR) 18 stores the Data 1 and Data 2 bits to be written into the memory 10. Further, a memory address register (MAR) 20 stores a three-digit binary address of the pair of Y-selection lines to be actuated; each pair consists of one line in each group 14 and 16. A decoder 22 receives the three-digit address and activates the one address conductor 24–1, 24–2 . . . 24–8 that the binary address identifies.

Further, a timing unit 26 produces Read (R*d*) and Write (W*r*) timing pulses, on terminals 26A and 26B respectively, to operate the memory 10.

The foregoing elements, all of which are old in connection with magnetic core memories, energize one Y-selection line in each of the four-line groups with Y-selection circuitry now to be described.

In general, the selection circuitry comprises a bank 28 of switches connected through isolating diodes 29 to the group 14 lines, a like bank 30 of switches connected to the group 16 lines, and a third switch bank 31 connected to the other ends of the lines in both groups 14 and 16. Digital logic circuitry is associated with each switch bank. The logic circuits associated with the first and second banks 28 and 30 receive the data, timing, and address signals described above. The logic circuit associated with the third switch bank 31 receives only the read and write timing pulses and the address signals. In response to these signals, the logic circuits and switch banks operate one Y-selection line in each group.

During either a Read or a Write operation, the switches apply a positive voltage from a direct voltage supply 32 to one line and apply a negative voltage from the supply to the other selected lines. The remaining lines in the two groups remain at an intermediate potential, illustrated as ground. Further, in both a Read operation and a Write ONE operation, a current pulse is applied to each selected line. The current direction corresponds to the voltage applied to each line. Hence the two selected lines receive oppositely directed currents. However, when a ZERO is to be written, no current is applied to the selected line, even though it is briefly clamped to one of the two voltages from supply 32.

More specifically, as also shown in the drawing, a two-input AND circuit 33 receives the Data 1 signal, and a like AND circuit 34 receives the Data 2 signal. The Write timing pulse from the timing unit terminal 26B is applied to the other input of both AND circuits.

The output signal from AND circuit 33 is applied to a first enabling input 36 to a coincidence circuit 38A and to a second enabling input 40 of a like coincidence circuit 38B. The output signal from the AND circuit 34 is applied to the terminal 40 of a coincidence circuit 38C and to the terminal 36 of a coincidence circuit 38D. The Read pulse from timing unit 26 is applied to the first enable input 36 of the coincidence circuits 38B and 38C and to the second enable input 40 of coincidence circuits 38A and 38D.

Each coincidence circuit 38A–38D also has eight ordered address inputs to which the address lines 24–1–24–8 from the decoder 22 are connected in order as shown.

A coincidence circuit 38A, 38B, 38C, 38D produces an output signal when either of two conditions are satisfied:

(1) there is a signal at its first enable input 36 and on any one of the first four address lines 24–1, 24–2, 24–3 or 24–4, or (2) there is a signal at its second enable input 40 and at any one of the second four address lines 24–5, 24–6, 24–7, or 24–8.

As shown in detail for the coincidence circuit 38A, this operation is readily achieved by applying each address signal to a separate two-input AND circuit 42, applying the first enable signal to the AND circuits receiving the first four address signals, and applying the second enable input to the AND circuits receiving the second four address signals. The outputs from these eight AND circuits 42 are OR'd together to produce the coincidence circuit output signal. The coincidence circuits 38B, 38C and 38D are similarly constructed.

The switch bank 28 has two switches 28A and 28B, each connected in series between a different terminal of the direct voltage supply 32 and the isolating diodes 29 connected to the group 14 Y-selection lines. Each switch is normally open, and closes when a signal is applied to its control input 44. The output signal from the coincidence circuit 38A is applied to the control input of switch 28A and switch 28B receives the output signal from coincidence circuit 38B at its control input.

There are two isolating diodes 29 connected to each group 14 line. Line 1A is connected to the cathode of diode 29A, the diode anode is connected to the switch 28B. Line 1A also connects to the anode of a diode 29B that is in series with switch 28A between the line and the negative supply terminal. The other group 14 lines 1B, 1C and 1D are connected to the switch bank 28 through two isolating diodes in the same manner.

Switch bank 30 also has two switches 30A and 30B whose control terminals 44 are conected to the coincidence circuits 38C and 38D respectively. Further, the switches 30A and 30B are connected with the direct voltage supply 32 and the group 16 lines 2A, 2B, 2C and 2D through isolating diodes 29 in the same manner as the group 14 lines.

A current-limiting resistor 43 is in series between the positive supply terminal and the switches 28B and 30B, and a like resistor 45 is in series between the negative supply terminal and switches 28A and 30A. The supply 32, which develops the positive and negative voltages relative to ground, and the resistor 43 in effect constitute a source of positive current, and the supply and resistor 45 constitute a source of negative current.

Turning to the bottom of the drawing, each of eight coincidence circuits 46A, 46B . . . 46H is similar to the coincidence circuit 38A except that it has only four ordered address inputs 42, 54, 56, 58 rather than eight. Accordingly, four of the eight address signal lines 24–1 . . . 24–8 from the decoder 22 are connected to each coincidence circuit 46A–46H, with the order of the connections being as shown. The Write timing signal is applied to a first enable input 48, and the Read signal to a second enable input 50, of each of these coincidence circuits.

A coincidence circuit 46A–46H produces an output signal either (1) when it receives a signal at its first enable input 48 coincident with an address signal at any one of the first two address inputs 52 and 54 or (2) when it receives coincident signals at its second enable input 50 and at any one of its second two address inputs 56 and 58. The coincidence circuit 46C, for example, thus produces an output signal in response to any one of four pairs of input signals:

(1) signals at terminals 48 and 52

(2) signals at terminals 48 and 54

(3) signals at terminals 50 and 56

(4) signals at terminals 50 and 58.

The switch bank 31 has eight normally open switches 31A, 31B, 31C, 31D, 31E, 31F, 31G and 31H. The control input 60 signal for each switch 31A–31H is the output signal from the coincidence circuit 46A–46H respectively. One switch connected to the positive supply terminal and one switch connected to the negative supply terminal are connected to one line in each group 14, 16 of Y-section lines. Thus, the switch 31A is in series between the positive supply terminal and lines 1A and 2A. Switch 31B is in series between the negative supply terminal and the same two lines. Switches 31C and 31D are similarly connected to the Y-selection lines 1B and 2B. switches 31E and 31F to the lines 1C and 2C and switches 31G and 31H to lines 1D and 2D.

A resistor 62 is connected to an intermediate voltage, illustrated as ground, from the interconnection of the two lines 1A and 2A that are connected to the same pair of switches 31A and 31B. A like resistor 62 is connected to ground from each other interconnection of two commonly-switched lines as shown. Although shown merely as a conductor, each selection line has measurable RLC parameters, particularly series resistance, series inductance and shunt capacitance to ground.

The operation of the selection circuit will now be described starting with a Read operation wherein the decoder 22 output address line 24–1 is energized; the remaining output lines 24–2 through 24–8 remain deenergized. The Read signal is applied to the second enable input 50 of each coincidence circuit 46A through 46H. However, the address signal on conductor 24–1 is only applied to one of the second two terminals 56 and 58 of coincidence circuits 46B and 46C. Accordingly only these coincidence circuits produce output signals.

In response, the switch 31B connected to the negative supply terminal and the switch 31C connected to the positive supply terminal receive control signals and close. As a result, switch 31B clamps the Y-selection lines 1A and 2A to a negative voltage corresponding to that developed at the negative supply terminal, and switch 31C clamps the conductors 1B and 2B to a positive voltage corresponding to that developed at the positive terminal of supply 32. With the illustrated supply 32, the positive and negative voltages are of equal magnitude and hence symmetrical about ground. The remaining coincidence circuits 46A, 46D, 46E, 46F, 46G and 46H do not produce output signals and the switches to which they are connected remain open. Hence the remaining Y-selection lines in the two groups 14 and 16 remain essentially at ground potential by virtue of the connection to ground through the resistors 62.

Of the four lines 1A, 2A, 1B and 2B thus placed at potentials other than ground by the operation of the coincidence circuits 46A–46H and the switch bank 31, only two lines, the lines 1A and 2B, receive Read current pulses. The switch banks 28 and 30 and the coincidence circuits 38A–38D perform this further selection as now described.

The simultaneous application of the Read signal to the first enable input 36 of coincidence circuits 38B and 38C and of the address signal on conductor 24–1, operates these two coincidence circuits to produce output signals that close switches 28B and 30A. The resultant coincident application of positive current from switch 28B to the anode of diode of 29A connected with line 1A, and of the negative direct voltage by switch 31B to the cathode of this diode forward biases the diode. Accordingly, Read current in the direction of arrow 64 is applied to the group 14 selection conductor 1A. The diode 29B connected with this selection conductor is back biased.

Furthermore, the forward-biased diode 29A connected with line 1A applies the negative potential on conductor 1A to the anodes of the other diodes 29A connected with the other group 14 selection lines. As a result, these other group 14 diodes 29A are reverse biased. Hence no significant current is applied to the other group 14 lines 1B, 1C and 1D.

In the group 16 of Y-selection lines, the combination of the closed switch 30A connected to the negative supply voltage and the closed switch 31C connected to the positive supply voltage forward bias diode 29B connected with line 2B and apply a Read pulse having the direction indicated with arrow 66 to that line. It will be noted that this current is of opposite polarity to the simultaneously developed Read current in line 1A. The other diodes 29B connected with group 16 lines are back biased and hence the other group 16 lines 2B, 2C and 2D receive essentially no current.

To illustrate the Write operation of the illustrated selection circuit, assume that the timing unit produces a Write pulse simultaneous with the development of an address signal on the decoder output line 24–3. Assume further that the memory buffer register 18 applies a ONE Data 1 signal and a ZERO Data 2 signal to the AND circuits 33 and 34 respectively. The conjunction of the Write pulse and the address signal on conductor 24–3 causes coincidence circuits 46E and 46H to produce output pulses that respectively close switches 31E and 31H. The remaining switches in the bank 31 remain open.

The coincidence of a binary ONE Data 1 signal and the Write pulse activate the AND circuit 33 to energize the first enable input 36 of coincidence circuit 38A and the second enable input 40 of coincidence circuit 38B. The address signal on the conductor 24–3 is applied to one of the first four address inputs of these two coincidence circuits and hence only the coincidence circuit 38A produces an output signal. As a result, in switch bank 28, switch 28A is closed and switch 28B remains open. The resultant combination of switches 28A and 31E being closed applies to the group 14 conductor 1C a Write pulse in the direction indicated with the arrow 68. No other group 14 line receives significant current.

In the group 16 lines, the binary ZERO Data 2 signal negates operation of the AND circuit 34 that also receives the Write pulse. Accordingly neither coincidence circuit 38C or 38D receives an enable input signal and hence both of the switches in the switch bank 30 remain open and none of the group 16 lines receives a write current. This is the desired condition for writing a ZERO.

The illustrated selection circuit thus, considered generally, comprises two switch means connected with the group 14 and group 16 selection conductors. One switch means 68 embraces the two switch banks 28 and 30 and all the logic elements connected with them, i.e. the diodes 29, the coincidence circuits 38A, 38B, 38C and 38D and the AND circuits 33 and 34. The second switch 70 means includes the switch bank 31 and the eight coincidence circuits 46A–46H.

In response to the data, address and Read/Write signals, the two switch means actuate a selected pair of the Y-selection lines, each pair comprising one line in each group. The two simultaneously selected lines do not receive currents in the same direction. Rather, unless one or both is operated to write a ZERO, they receive currents in opposite directions relative to each other.

The present selection circuit thus selects pairs of conductors with three switch banks associated with coincidence logic circuits. Each selected conductor can be considered as grouped with other conductors so that the two selected conductors are in different conductor groups.

In the prior art, selection of two conductors in this manner would require two banks of switches for each group of conductors, or a total of four switch banks. Specifically, a prior art selection circuit for performing the selection operation described herein with reference to the drawing would require a switch bank 28 and the entire switch bank 31 to select one group 14 line. In addition, the switch bank 30 and a second eight-switch bank 31 would be required to select one group 16 line. The elimination of the fourth switch bank from the prior art structure by virtue of the present invention results in material savings in cost and size.

The illustrated selection circuit for operation with two groups of four lines each can be expanded, with conventional techniques, for operation with larger conductor groups; groups of only four lines each are illustrated for simplicity.

It will thus be seen that the objects set forth above, among those made apparent from the preceding description, are efficently attained and since certain changes may be made in the above construction without departing from the scope of the invention, it is intended that all matter contained in the above description or shown in the accompanying drawing shall be interpreted as illustrative and not in a limiting sense.

It will thus be seen that the objects set forth above, are intended to cover all of the generic and specific features of the invention herein described, and all statements of the scope of the invention which, a matter of language, might be said to fall therebetween.

Having described the invention, what is claimed as new and desired to be secured by Letters Patent is:

1. lectrical selection apparatus for energizing selected ones of plural conductors ordered in first and second groups thereof in response to digital control signals, said apparatus comprising:

(A) first switch means in circuit with first ends of said conductors and arranged to receive said control signals, (B) second switch means, (1) in circuit with second ends of said conductors and arranged to receive said control signals, and (2) comprising plural switch elements each connected with one line in each said group thereof, (C) said first and second switch means being arranged to apply substantially simultaneous currents of opposite direction to one selected conductor in each group thereof in response to said control signals.

2. Apparatus according to claim 1

(A) further comprising means normally maintaining said conductors at a first potential, (B) in which said second switch means is arranged to apply a second potential to a single first conductor in each group thereof and to apply a third potential to a single second conductor in each group thereof, where said first potential is intermediate said second and third potentials, and (C) in which said selected conductors are said first conductor in said first group thereof and said second conductor in said second group.

3. Apparatus according to claim 1

(A) in which each conductor in said first group is associated with one conductor in said second group, and (B) said first and second switch means are further arranged to apply said simultaneous currents only to associated conductors.

4. Electrical selection apparatus for energizing selected ones of plural conductors ordered in first and second groups thereof in response to digital control signals, said apparatus comprising:

(A) second switch means
  (1) in circuit with second ends of said conductors arranged to receive said control signals,
  (2) comprising plural switch elements each of which is connected with one conductor in each said group thereof, and
  (3) responding to said signals to operate said switch elements therein to apply a second potential to a single first conductor in each group thereof and to apply a third potential to a single second conductor in each group thereof, (B) first switch means
  (1) in circuit with first ends of said conductors and arranged to receive said control signals, and
  (2) responsive to said control signals to apply current to not more than one first conductor and to one second conductor, where said current-receiving conductors are in different groups thereof.

5. Apparatus according to claim 4 in which (A) said first switch means apply said currents independently of each other, and (B) said second switch means apply said potentials to said first and second conductors substantially simultaneously.

6. Electrical selection apparatus for connection with plural two-ended bilateral circuit elements arranged in first and second groups thereof and each arranged normally to have one end thereof at a first potential, said apparatus comprising:

(A) first switch means
  (1) having at least first, second, third and fourth normally open switch elements,
  (2) having ($n$) first diode elements each of which is in series between said first switch element and a first end of a different one of ($n$) circuit elements in said first group thereof and arranged to conduct current in a first direction,
  (3) having ($n$) second diode elements each of which is in series between said second switch element and said first end of a different one of said ($n$) conductors in said first group thereof and arranged to conduct current in a second direction opposite to said first direction,
  (4) having ($n$) third diode elements each of which is in series between said third switch element and a first end of a different one of ($n$) conductors in said second group thereof and arranged to conduct current in said first direction,
  (5) having ($n$) fourth diode elements each of which is in series between said fourth switch element and said first end of a different one of said ($n$) conductors in said second group thereof and arranged to conduct current in said second direction,
  (6) having current source means arranged to apply current in said first direction to said first and third switch elements and to apply current in said second direction to said second and fourth switch elements, and (B) second switch means
  (1) arranged to apply a second potential to the other end of one of said ($n$) circuit elements in each of said first and second groups thereof, and
  (2) arranged to apply a third potential to the other end of one of said ($n$) circuit elements in each of said first and second groups thereof, where said first potential is intermediate said second and third potentials.

7. Selection apparatus according to claim 6 in which said second switch means (A) comprises ($n$) pairs of normally open switch elements, each pair consisting of a fifth switch element and a sixth switch element, (B) has voltage source means arranged to apply a voltage corresponding to said second potential to a fifth switch element in each pair thereof and to apply a further voltage corresponding to said third potential to a sixth switch element in each pair thereof, and (C) is arranged to close substantially simultaneously a single fifth switch element in one pair thereof and a single sixth switch element in another pair thereof.

8. Selection apparatus according to claim 7 in which (A) said first switch means further comprises first digital logic means arranged to operate said first, second, third and fourth switch elements in response to digital signals including a set of address signals identifying one said circuit element in each said group thereof, and (B) said second switch means further comprises second digital logic means arranged to operate said fifth and sixth switch elements in response to digital signals including said set of address signals.

9. Apparatus according to claim 8 in which each of said first and second logic means is arranged to operate no more than two switch elements in said switch means connected therewith.

10. Electrical selection apparatus comprising (A) first and second groups of plural two-ended conductors, (B) a first terminal for receiving a first direct voltage, (C) a second terminal for receiving a second direct voltage measurably different from said first voltage (D) normaly inactive switch devices arranged in first, second and third banks thereof, each bank consisting of an even number of said switch devices,
  (1) said first group of conductors being in series between switch devices in said first and third switch banks,
  (2) said second group of conductors being in series between switch devices in said second and third switch banks,
  (3) half the switch devices in each bank being further connected with said first terminal and the other half being further connected with said second terminal,
  (4) said third switch bank being so further arranged that activation of any one switch device therein applies to a single conductor in each group, a potential corresponding to whichever of said first and second voltages said activated switch device is connected, and (E) logic means connected with said third switch bank and operable to activate simultaneously only two switch device in said third bank, said two simultaneously-activated switch devices being connected to different ones of said first and second terminals.

11. Selection apparatus according to claim 10

(A) further comprising diode-type isolating means connected between one end of each conductor and two switch devices in the bank connected therewith, said two switch devices being connected with different ones of said first and second terminals, (B) in which each switch bank connected to said isolating means is so arranged that activation of any one switch device therein applies to said isolating means connected with the activated switch device, a current corresponding to said direct voltage connected with that switch device, and (C) in which said logic means is further connected with said first and second switch banks, and is further operable to activate simultaneously no more than a single switch device in each of said first and second switch banks, which simultaneously activated switch devices are connected with different ones of said first and second terminals.

References Cited

UNITED STATES PATENTS

| | | | |
|---|---|---|---|
| 3,289,191 | 11/1966 | Schauer | 340—176 |
| 3,351,924 | 11/1967 | Meyerhoff et al. | 340—174 |

DONALD J. YUSKO, Primary Examiner

U.S. Cl. X.R.

340—176